United States Patent [19]

Mahoney et al.

[11] Patent Number: 5,217,620

[45] Date of Patent: Jun. 8, 1993

[54] CLARIFICATION AID FOR THE BAYER PROCESS

[75] Inventors: Robert P. Mahoney, Warrenville; Lawrence J. Connelly, Oak Lawn; Robert L. Wetegrove, Winfield, all of Ill.

[73] Assignee: Nalco Chemical Company, Naperville, Ill.

[21] Appl. No.: 980,387

[22] Filed: Nov. 23, 1992

[51] Int. Cl.$^5$ .............................. C01F 7/46; C02F 1/56
[52] U.S. Cl. .................................... 210/728; 210/730; 423/121
[58] Field of Search ............... 210/725, 727, 728, 730, 210/731; 423/121, 122, 127

[56] References Cited

U.S. PATENT DOCUMENTS

| | | | |
|---|---|---|---|
| 3,085,853 | 4/1963 | Lesinski et al. | 23/52 |
| 3,320,136 | 5/1967 | Zajic | 195/31 |
| 3,397,953 | 8/1968 | Galvin et al. | 23/143 |
| 3,406,114 | 10/1968 | Goren | 210/54 |
| 3,445,187 | 5/1969 | Sibert | 23/143 |
| 3,541,009 | 11/1970 | Arendt et al. | 210/52 |
| 3,681,012 | 8/1972 | Sibert | 23/143 |
| 5,008,089 | 4/1991 | Moody et al. | 423/121 |
| 5,041,269 | 8/1991 | Moody et al. | 210/727 |
| 5,091,159 | 2/1992 | Connelly et al. | 210/727 |

OTHER PUBLICATIONS

The importance and degradation of starch in the Bayer Process; Lux, Laszlo, Huszar, Gantner, and Hollo; Die Starke, vol. 19, No. 5, 1967, pp. 129-134.

Flocculant and Chemical Properties of a Polysaccharide from *Pullularia pullulans*; Zajic and LeDuy; Applied Microbiology, vol. 25, No. 4, 1973, pp. 628-635.

Microbial Polysaccharides; J. Wiley; Encyclopedia of Chemical Technology, vol. 15, pp. 439-455.

Biopolymers; J. Wiley; Encyclopedia of Chemical Technology, vol. 3, 1978, pp. 896-901.

Carbohydrates; J. Wiley; Encyclopedia of Chemical Technology, vol. 4, 1978, pp. 548-551.

*Primary Examiner*—Stanley S. Silverman
*Assistant Examiner*—Neil M. McCarthy
*Attorney, Agent, or Firm*—Joan I. Norek; Robert A. Miller; Joseph B. Barrett

[57] ABSTRACT

A process for improved flocculation of Bayer process red mud-containing liquor uses a conventional water soluble anionic flocculant to form a red mud phase and a supernatant from the red mud-containing liquor, the supernatant containing suspended solids. The process is characterized by the addition of a water soluble clarification aid in addition to the conventional flocculant, wherein the clarification aid is pullulan, lactan, zooglan, rhamsan, or combinations thereof. The clarification aid is added to the red mud-containing liquor in an amount sufficient to reduce the concentration of suspended solids in the supernatant.

21 Claims, No Drawings

CLARIFICATION AID FOR THE BAYER PROCESS

TECHNICAL FIELD OF THE INVENTION

The present invention is in the technical field of clarification of red mud-containing liquors, particularly the primary settler liquor, generated in the Bayer process for the recovery of alumina from bauxite ore.

BACKGROUND OF THE INVENTION

In the Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate product is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where about 98% of the total available alumina is released from the ore as caustic-soluble sodium aluminate. The digested slurry is then cooled to about 230° F., typically employing a series of flash tanks wherein heat and condensate are recovered. The aluminate liquor leaving the flashing operation contains from about 1 to about 20 weight percent solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. The slurry of aluminate liquor and the finer solids is normally first fed to the center well of a mud settler, or primary settler, where it is treated with a flocculant, and as the mud settles, clarified sodium aluminate solution, referred to as "green" or "pregnant" liquor, overflows a weir at the top. This overflow from the mud settling tank is passed to the subsequent process steps. If the aluminate liquor overflowing the settler contains an unacceptable concentration of suspended solids (at times from about 50 to about 500 mg of suspended solids per liter), it is then generally further clarified by filtration to give a filtrate with no more than about 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

In another section of the Bayer circuit, the settled solids of the primary settler ("red mud") are withdrawn from the bottom of the settler and passed through a countercurrent washing circuit for recovery of sodium aluminate and soda. As noted above, the red mud does not include any coarser particles removed prior to feeding the slurry to the primary or mud settler.

The at least partial separation of the red mud solids from the pregnant liquor at elevated temperatures by settling or by filtration is expedited by the use of a flocculant. This initial clarification of the pregnant liquor is referred to as the primary settler stage. Flocculating agents improve the separation of insolubles by increasing the rate at which the solids settle, by reducing the amount of residual solids suspended in the liquor, and by decreasing the amount of liquor in the settled solids phase. Flocculation performance is highly important in the primary settlement stages. Red muds are comprised chiefly of iron oxides (at least about 50 weight percent of the red mud solids), together with silicon oxides, calcium oxides, sodium alumino-silicates, titanium oxides and other materials, and commonly represent from about 5 to about 50 weight percent of the material of the bauxite ore. Generally these muds are comprised of very fine particles, which hinder the desired rapid and clean separation of red mud particles from the solubilized alumina liquor. If the rate of separation is slow, output is materially diminished and overall process efficiency is impaired. If the separation is not clean, the resultant solubilized aluminate liquor will require a more extensive treatment to remove residual solids, and/or the trihydrate recovered will contain levels of impurities that are undesirably high for many end-uses.

The polysaccharides starch and dextran were used early in red mud flocculation. For instance, U.S. Pat. No. 3,085,853, Apr. 16, 1963, Lesinski et al., uses native dextrans to increase the rate of sedimentation of finely divided solids in aqueous suspensions and thereby facilitate the separation of such solids. Later synthetic polymeric flocculants became more commonly employed for the Bayer process. U.S. Pat. No. 3,397,953, Aug. 20, 1968, Galvin et al., uses a blend of starch and polyacrylic acid on red mud suspensions, noting that polyacrylic acid alone is not suitable as a flocculating agent. The polyacrylic acids exemplified generally have molecular weights of less than 300,000. The flocculation and sedimentation activity of the blend is exemplified in the primary settler stage of a bauxite process. U.S. Pat. No. 3,445,187, May 20, 1969, Sibert, uses synthetic acrylic acid polymer alone to enhance the rate of separation of red mud solids from the aqueous caustic solutions during secondary clarification steps. The synthetic polymer used contains at least about 80 weight percent of the acrylic acid mer unit, and has a molecular weight in excess of 50,000, and preferably in excess of 100,000. U.S. Pat. No. 3,541,009, Nov. 17, 1970, Arendt et al., uses a combination of causticized or modified starch, a water soluble polymer, and a caustic alkali to enhance the coagulation, sedimentation and/or filtration of aqueous suspensions of solids, including the settling of red mud from Bayer process liquor. The water soluble polymer is derived from at least one olefinically-unsaturated monomer and has a molecular weight in excess of 100,000. U.S. Pat. No. 3,681,012, Aug. 1, 1972, Sibert, uses an acrylic acid polymer most preferably having a molecular weight of at least 1,000,000, either alone or in combination with starch, for clarification of digested bauxite containing solubilized alumina and red mud residues. U.S. Pat. No. 4,767,540, Aug. 30, 1988, Spitzer et al., uses a polymer that contains hydroxamic acid groups. U.S. Pat. No. 5,008,089, Apr. 16, 1991, Moody et al., uses a combination of dextran and synthetic anionic polymer for flocculating red mud in Bayer process liquors.

U.S. Pat. No. 3,320,136, May 16, 1967, Zajic, uses a polysaccharide flocculant produced by black yeast microorganisms, which include *Pullularia pullulans, Dematium chodati*, and forms of *Cladosporium herbarmum*, for flocculating clays slimes, the flocculation activity being demonstrated on finely divided slimes in potash brine. U.S. Pat. No. 3,406,114, Oct. 15, 1968, Goren, similarly demonstrates the use of polysaccharides produced by the bacterial activity of *Pullularia pullulans*, and others, as flocculants for potash ore, uranium ore and phosphate ore leach liquors.

The synthetic flocculating agents employed for the settling or filtration of red mud are generally water soluble polymers of one or more ethylenically-unsaturated monomers, and have been used together, as noted above, with starch and dextran for aluminate liquor clarification. The synthetic flocculating agents are usually anionic, and the optimum anionic content of such polymer is usually related to the alkalinity of the liquor. In the washing circuit, the early wash liquors have the highest alkalinity and may require a more highly anionic polymer than the later wash liquors.

It is an object of the present invention to provide a more effective flocculation for separating red mud from the red mud-containing liquors, particularly the primary settler liquor, of the Bayer process. It is an object of the present invention to provide a method whereby the suspended solids retained in the supernatant after flocculation of the red mud-containing liquors, particularly the primary settler liquor, of the Bayer process are diminished. It is an object of the present invention to provide a more effective Bayer process wherein flocculation for separating red mud from the red mud-containing liquors, particularly the primary settler liquor, is improved by a more complete flocculation of the solids. Such red mud-containing liquors include the liquors of the counter-current mud washers. These and other objects of the present invention are described in more detail below.

DISCLOSURE OF THE INVENTION

The present invention provides a method for improved flocculation of Bayer process red mud-containing liquors, particularly the primary settler liquors, using, in addition to a conventional flocculant, certain polysaccharides to reduce the suspended solids concentration of the supernatant liquor. The present invention also provides a more effective Bayer process wherein flocculation for separating red mud from the red mud-containing liquors, particularly the primary settler liquor, is improved by the addition of a certain polysaccharide together with a conventional flocculant so as to promote a more complete flocculation of the solids.

PREFERRED EMBODIMENTS OF THE INVENTION

The Bayer process liquors generally are aqueous media containing dissolved sodium aluminate and red mud solids at various concentrations. Such liquors include the primary settler slurry or feed, which contains high concentration levels of both red mud and dissolved sodium aluminate, the red mud washing slurries, which have high red mud concentrations but lesser concentrations of sodium aluminate and total alkalinity, and the secondary clarification liquors, which are rich in dissolved sodium aluminate but contain much less red mud than the other types of liquors. As discussed above, the separation of the red mud from the sodium aluminate and its aqueous phase is continued from the primary settlement stage until concentrated red mud is eliminated from the process circuit, and from the primary settlement stage until the clarified liquor is subjected to the alumina trihydrate crystallization.

The flocculation of red mud, which routinely precedes either settling or filtration, is most difficult in the primary settlement stage because of the high concentration of fine particles, and the high concentration of total alkalinity. Improvement of the flocculation effectiveness in the primary settlement stage is extremely important to the entire Bayer process. By reducing the level of suspended solids that remain in the supernatant above the floc formed in the primary settler liquor, the solids to be removed during secondary clarification stages are diminished.

In the Bayer process the bauxite ore is digested under highly alkaline conditions, and the typical primary settler liquors are routinely highly alkaline, containing sodium or calcium hydroxide, sodium aluminate, and commonly sodium carbonate. The total alkalinity of primary settler feed, that is the liquor charged to the primary settlement stage, is typically from about 100 to 300 grams per liter of settler feed, as sodium carbonate. The solids contents of typical primary settler feeds vary from about 25 or 30 grams per liter of settler feed to about 80 or 85 grams per liter of settler feed.

By primary settler feed is meant herein the Bayer process digested slurry as charged to the first solids/liquid separation stage. Such feed may be an admixture of the digested slurry plus dilution liquor, and the dilution liquor is routinely the counter current technique wash water from the red mud washing stages discussed above. The primary settler feed differs from the liquors or slurries subjected to clarification and/or separation in the secondary clarification stage or the red mud washing stages by composition as to the solids content, dissolved sodium aluminate content, and total alkalinity. The primary settler feed also differs from the liquors or slurries subjected to clarification and/or separation in the secondary clarification stage or the red mud washing stages in that no insoluble fraction thereof has received an earlier flocculation treatment. An improved clarification of Bayer process primary settler liquors is the principle object of the present invention. Nonetheless in broad embodiment the present invention is directed to the clarification of red mud-containing liquors, particularly the counter-current wash liquors in addition to the primary settler liquors of the Bayer process.

Upon flocculation of a primary settler feed, typically employing a synthetic polymeric flocculant, a clear liquor/mud interface will form, and will gradually settle, providing a clear liquor supernatant layer overlying a mud layer. The lower mud layer contains the flocculated material, and as discussed above is comprised of both red mud solids and some amount of pregnant liquor. The overlying supernatant is the liquor that is separated for secondary clarification, again as discussed above. This supernatant is "mud-clear" and the interface between it and the mud layer is clearly seen in some cases, but the supernatant is not entirely free of suspended solids, appearing instead as a hazy, but transparent, liquid. The present invention diminishes the amount of suspended solids in such supernatant, and hence decreases the extent of secondary clarification required to obtain a given purity of sodium aluminate solution.

The digested slurry is typically discharged from the flash tanks at elevated temperatures and the primary settler feed is generally not further cooled before charging to the primary settlement stage other than the cooling which may occur when a digested slurry is optionally admixed with the liquor from the first red mud wash stage to form the primary settler feed. The flocculation of the primary settler feed is thus routinely conducted at atmospheric pressures and at elevated temperatures of from about 80° or 90° C. to about 105° or 115° C.

In preferred embodiment, the polymeric flocculant and the polysaccharide clarification aid are both added to the primary settler feed as aqueous solutions to facilitate rapid dispersion of each agent within the primary settler feed. An overly dilute solution of the polymeric flocculant or the polysaccharide clarification aid will unnecessarily add water to the primary settler feed and generally unnecessarily dilute the supernatant. For most polymeric flocculants, an aqueous solution containing from about 0.01 to about 0.5 weight percent of polymer actives is generally reasonable. For the polysaccharide clarification aid, an aqueous solution containing from about 0.01 to about 2.5 weight percent of polysaccharide actives is generally reasonable. To further facilitate the dispersion of these agents in the primary settler feed, in preferred embodiment one or both are added as alkaline aqueous solutions, for instance having a pH of at least about 9, and more preferably at least about 10.

In preferred embodiment the polymeric flocculant and the polysaccharide clarification aid are added sequentially, the polymeric flocculant being added ahead of the polysaccharide clarification aid. In preferred embodiment the primary settler feed is subjected to mechanical agitation after both the addition of the polymeric flocculant and the polysaccharide clarification aid. Mechanical agitation may be accomplished by flow of the slurry through the feed pipe, by feeding into the settler, or by turbulence in the feeding region, usually the center well, of the settler. In preferred embodiment, after the polymeric flocculant and the polysaccharide clarification aid are added, the mud layer or bed is allowed to settle before the supernatant and mud layers are separated, and during such settling time mechanical agitation of the liquor is avoided.

The present invention does not, however, exclude variations from preferred embodiments. For instance, the polymeric flocculant and the polysaccharide clarification aid may be added concomitantly, either as separate but simultaneous charges, or together as a blend, and in some instances the clarification aid may be added ahead of the flocculant, provided that such variations do not so diminish the performance of the present method that its employment is not commercially practical. The polymeric flocculant and/or the polysaccharide clarification aid may added as aqueous solutions having pH values of less than 9. The mechanical agitation of the primary settler feed either after the addition of the polymeric flocculant or after the addition of the polysaccharide clarification aid may be omitted, again provided that such variations do not so diminish the performance of the present method that its employment is not commercially practical.

The above and other preferred embodiments are believed equally applicable to the clarification of countercurrent red mud wash liquors.

The polymeric flocculant employed in the process of the present invention is anionic, but it may have some nonionic or even cationic mer units. The polymeric flocculant employed in the process of the present invention may be derived from ethylenically-unsaturated monomers, and if so the polymer mer units will be comprised of two adjacent backbone carbons plus the substituents pendant therefrom. The polymer may be comprised of from about 0 to about 20 or 30 mole percent of nonionic mer units, such as (meth)acrylamide mer units, which are nonionic, but polar, mer units, and from about 70 or 80 mole percent to about 100 mole percent of anionic mer units. The anionic mer units may contain pendant carboxyl radicals, such as (meth)acrylic acid, itaconic acid, maleic acid, crotonic acid and the like, and salts thereof with monovalent cations ("monovalent salts thereof), particularly sodium salts thereof, and preferably such anionic mer units are in a monovalent salt form. The anionic mer units may be N-sulfoalkyl (meth)acrylamide mer units, which provide a pendant sulfonate radical. The anionic mer units may contain pendant hydroxamic acid groups or derivatives thereof. The polymeric flocculant may be substantially a homopolymer of (meth)acrylic acid or monovalent salt(s) thereof, or substantially a homopolymer of N-sulfoalkyl (meth)acrylamide. In another embodiment, the flocculant may be a polymer comprised of up to about 20 or 30 mole percent of (meth)acrylamide mer units, the remainder being N-sulfoalkyl (meth)acrylamide mer units or anionic acrylate mer units or combinations thereof.

U.S. Pat. No. 4,678,840 (Fong et al.) issued Jul. 7, 1987, describes a method for preparation acrylamide polymers having ionizable phosphonate groups, and the disclosures of this patent are incorporated hereinto by reference. Phosphonate-containing acrylamide polymers that meet the preferred molecular weight ranges may possibly be as active in the present process as other anionic acrylamide polymers described above.

In another embodiment, the polymeric flocculant may contain a minor amount of cationic mer units, preferably of the quaternary ammonium salt type, such as the quaternized salts of mer units of N-alkylsubstituted aminoalkyl esters of acrylic acid and others, including, for example:
1. the quaternized salts of reaction products of a polyamine and an acrylate type compound prepared, for example, from methyl acrylate and ethylenediamine;
2. (methacryloyloxyethyl)trimethyl ammonium chloride;
3. diallylmethyl(beta-propionamido)ammonium chloride, (beta-methacryloyloxyethyl)trimethylammonium methyl sulfate, and the like;
4. quaternized vinyllactam;
5. the quaternized salt of vinylbenzyltrialkylamines;
6. quaternized salt of vinyl-heterocyclic monomers having a ring nitrogen, such as (1,2-dimethyl-5-vinylpyridinium methyl sulfate), (2-vinyl-2-imidazolinium chloride) and the like;
7. dialkyldiallylammonium salt including diallyldimethyl ammonium chloride ("DADMAC"); and
8. methacrylamidopropyltrimethylammonium chloride ("MAPTAC").

In any embodiment in which the polymeric flocculant contains cationic mer units, such amphoteric polymer should remain highly anionic in nature, and the cationic mer units should not exceed about 5 or 10 mole percent of the polymer.

Non-interfering mer units other than (meth)acrylamide may be used, such as methylol acrylamide or other nonionic but polar mer units, and even nonpolar mer units may be used to the extent that the presence of such mer units does not interfere with the water solubility of the polymeric flocculant. The polymeric flocculant generally should have a weight average molecular weight of at least about 500,000, and preferably at least about 1,000,000, and even more preferably at least about 4,000,000, or 5,000,000. The polymeric flocculant has no standard molecular weight ceiling for the purposes of the present invention, and some flocculants having molecular weights of 15,000,000 or higher may be highly useful for the present invention.

The polymeric flocculant employed in the present invention should be water soluble. The water solubility characteristic preferably is defined in terms of fluidity of aqueous solutions of the polymer. By "water soluble" is meant herein, and generally, that an aqueous solution of the polymer, at the polymer actives concentration at which it is charged to the primary settler feed, is reasonably fluid, and preferably has a viscosity of no more than about 5,000 to 20,000 cps Brookfield, at ambient room temperature (from about 23° to about 26° C.). Such water solubility characteristic generally does not create a molecular weight ceiling because even an acrylamide homopolymer, substantially free of any electrolytic groups, meets such a standard at the high molecular weights that can now be provided by conventional synthesis techniques, provided the polymer is substantially linear, and hence the highly anionic polymeric flocculants employed in the present invention will generally be even more water soluble at a given molecular weight.

Vinyl addition polymers comprised of anionic acrylate mer units and/or N-sulfoalkyl (meth)acrylamide mer units, optionally together with (meth)acrylamide mer units, may be directly synthesized from the corresponding monomers by known techniques, for instance using as the sulfonate-containing monomer the 2-acrylamido-2-methylpropane sulfonic acid, or the methacrylamide version thereof. N-sulfoalkyl (meth)acrylamide mer units can also be incorporated into an existing polymer by post-polymerization derivatization, for instance by one of the methods described in U.S. Pat. No. 4,762,894 (Fong et al.) issued Aug. 9, 1988, U.S. Pat. No. 4,680,339 (Fong) issued Jul. 14, 1987, U.S. Pat. No. 4,795,789 (Fong) issued Jan. 3, 1989, and U.S. Pat. No. 4,604,431 (Fong et al.) issued Aug. 5, 1986, the disclosures of all of which are hereby incorporated hereinto. The sulfonated mer units of such post-polymerization derivatized polymers are generally of the sulfonate N-alkyl substituted (meth)acrylamide type.

High molecular weight polymeric flocculants of the type described above are commonly synthesized and commercially supplied in the form of water-in-oil latices. Such latex form is a common commercial form because it permits the polymer to be prepared and shipped at reasonably high concentrations (and the polymer therein is readily dispersible in water upon inversion of such emulsion by known techniques, which is desirable for many use applications). Water-in-oil latices of vinyl addition polymers are well known and are described, for instance, in U.S. Pat. No. 3,284,393, Vanderhoff, and U.S. Pat. No. Re. 28,474, Anderson-Frisque, and the disclosures of these patents are incorporated herein by reference. The use of high molecular weight water soluble polymeric flocculants supplied in dry powder form is of course not excluded, and the preparation of a solution from dry powder eliminates the presence of the oil constituent present in the latex form.

The typical polymeric flocculant is substantially linear and substantially free of pendant hydrophobic radicals or hydrophobic polymer backbone segments, but the present invention does not exclude the use of polymers having some branching or cross-linking, or some hydrophobic moieties, provided the polymer retains its water solubility and flocculation activity. An amphoteric polymer, as noted above, also is not excluded for use in the present process.

The present invention in one embodiment employs pullulan, lactan, zooglan, rhamsan, or combinations thereof as the clarification aid. In a preferred embodiment the clarification aid is pullulan. These polysaccharides have demonstrated surprisingly greater activity in reducing the suspended solids in the supernatant of a flocculated primary settler feed than polysaccharides such as starch and dextran, and it is believed that a comparable activity level would be seen when used to clarify mud wash liquors.

Native starches, $(C_6H_{10}O_5)_n$, are mixtures of two polymers, namely, amylose, a linear polymer of glucose joined by a 1,4-glycosidic linkage, and amylopectin, a branched polymer of glucose. Amylopectin has mostly alpha-D-1,4-glycosidic linkages and approximately 4% of the branch-point alpha-D-1,6-glycosidic linkages. The amylopectin branches are about 12 glucose mer units long and occur on average at every twelfth glucose mer unit. The linear amylose chains vary in molecular weight from a few thousand to about 500,000. Most starches contain from about 15 to about 30% amylose, and most commonly from about 22 to about 30% amylose, the remainder being amylopectin. The starch in corn, for instance, contains approximately 27% amylose and 73% amylopectin.

Dextran is a class of polysaccharide synthesized by bacterial enzymes (dextransucrases, glucansucrases, or glucosyltransferases) to provide D-glucans having backbones of D-glucose units linked predominatly alpha-1,6 glycosidic linkages, and having branch linkages of variable amounts of alpha-1,2, alpha-1,3, alpha-1,4 glycosidic linkages. Several organisms produce dextrans but generally only *Leuconostoc mesenteroides*, NRRL B-512 (F) and *Lactobacteriaceae dextranicum* have been used commercially for dextran production. Chemical and physical properties of the dextrans vary with the methods of production. Native dextrans usually have high molecular weights, which may exceed 1,000,000. The lower molecular weight clinical dextrans usually are prepared by depolymerization of native dextrans or by synthesis under limiting conditions. All dextrans are composed of alpha-D-glucopyranosyl units, differing only in degree of branching and chain length. Dextran 40 is produced by action of *L. mesenteroides* on sucrose and has an average molecular weight of 40,000. Dextran 70 has an average molecular weight of 70,000. Dextran 75 has an average molecular weight of 75,000.

Pullulan is a linear (poly)maltotriose linked through alpha-1,6 bonds on terminal glucopyranosyl groups of the trisaccharide. Pullulan is an extracellular polysaccharide produced by the dimorphic fungus *Aureobasidium* (formerly *Pullularia*) *pullulans*. It is comprised of alpha-1,4 and alpha-1,6 glucopyranosyl units in the approximate ratio of 2:1. It is considered a (poly)- maltotriose because the arrangement of the two linkages is not random, but instead it has been found that maltotriose is the main product formed by pullulanase cleavage of solely the alpha-1,6 glycosidic linkages. The pullulan molecule can also be considered as a chain of amylose, the linear component of starch, in which an alpha-1,6 bond replaces every third alpha-1,4 bond. The partial substitution of 1,6 bonds for 1,4 bond introduces flexibility and interrupts the regularity of the linear chain.

Lactan is a high molecular weight anionic polysaccharide comprised of mannose, galactose, and galacturonic acid units in the approximate molar ratio of 5:3:2. Lactan is produced by the lactose-utilizing bacterium *Rhizobium sp.*, ATCC-55046.

Zooglan is a high molecular weight anionic polysaccharide comprised of glucose and galactose units in the approximate molar ratio of 2:1, with minor amounts of succinate and pyruvate in the backbone structure. Zooglan is produced by *Zooglea ramigera* 115, ATCC-25935, a gram negative, floc forming obligate aerobe.

Rhamsan is a high molecular weight polysaccharide produced by aerobic fermentation using an *alcaligenes* strain, ATCC-31961. The polymer backbone is comprised of D-glucose, D-glucuronic acid, and L-rhamnose units with a two glucose residue side chain.

The polysaccharide clarification aids are generally of high molecular weight, for instance a molecular weight of at least about 50,000, and clarification aids of at least 100,00 or 500,000 molecular weight may be preferred. In another preferred embodiment the polysaccharide clarification aid is within the molecular weight range of from about 500,000 to about 10,000,000 or 15,000,000, provided the clarification aid is water soluble at the concentration it is used, as discussed above regarding the anionic polymeric flocculant.

The anionic flocculant is added to the red mud-containing liquor in an amount sufficient to flocculate the red mud. In preferred embodiment, the anionic flocculant is added to the red mud-containing liquor in an amount sufficient to form a red mud phase therein having a concentration of solids that is at least about 150 percent of the initial concentration of solids in the red mud-containing liquor upon standing under conventional conditions (time and degree of mechanical agitation employed in a given industrial process). In another preferred embodiment the anionic flocculant is added to the red mud-containing liquor in an amount of from about 0.5 to about 20 mg of flocculant actives per liter of red mud-containing liquor, and more preferably from about 2 to about 8 mg of flocculant actives per liter of red mud-containing liquor. In another preferred embodiment the anionic flocculant is added to the red mud-containing liquor in an amount of from about 0.001 to about 0.1 weight percent of flocculant actives based on the solids of red mud-containing liquor, and more preferably from about 0.005 to about 0.03 weight percent of flocculant actives based on the solids of red mud-containing liquor. In these preferred embodiments, the red-mud containing liquor is preferably a settler feed liquor, but the present invention does not exclude the use of the present process on one or more of the counter-current mud wash liquors.

The clarification aid is added to the red mud-containing liquor in an amount sufficient to reduce the suspended solids in the supernatant. In preferred embodiment, the clarification aid is added to the red mud-containing liquor in an amount sufficient to form a supernatant therein having a concentration of solids that is at least about 25 percent less than the concentration of solids in the supernatant formed without the clarification aid, upon standing under conventional conditions (time and degree of mechanical agitation employed in a given industrial process). In another preferred embodiment the clarification aid is added to the red mud-containing liquor in an amount of from about 0.05 to about 50 mg of clarification aid actives per liter of red mud-containing liquor, and more preferably from about 1.0 to about 20 mg of clarification aid actives per liter of red mud-containing liquor. In another preferred embodiment the clarification aid is added to the red mud-containing liquor in an amount of from about 0.0005 to about 0.1 weight percent of clarification aid actives based on the solids of red mud-containing liquor, and more preferably from about 0.002 to about 0.03 weight percent of clarification aid actives based on the solids of red mud-containing liquor. In another preferred embodiment the clarification aid is added to the red mud-containing liquor in an amount of from about 5 to about 500 weight percent of clarification aid actives based on the flocculant actives added, and more preferably from about 25 to about 150 weight percent of clarification aid actives based on the flocculant actives added. In these preferred embodiments, the red-mud containing liquor is preferably a settler feed liquor, but the present invention does not exclude the use of the present process on one or more of the counter-current mud wash liquors.

TEST PROCEDURE

The general procedure employed in the following examples is a laboratory test that determines the performance of clarification aids, as follows.

1. Twelve one-liter size test samples of a 90° to 100° C. settler feed are obtained from a 19-liter sample of settler feed. (Such settler feeds were obtained from various bauxite refineries identified as refinery "A" to "C" in the examples below.) To assure that the contents of each test sample are uniform, the settler feed is ladled from a bucket into one-liter graduated cylinders as follows. The settler feed is stirred before each portion taken and the remainders from each scoop being returned to the bucket; the graduated cylinders are first filled only half way; and then the graduated cylinders are filled to the one-liter mark in a reverse order. The graduated cylinders are then stoppered and placed in a 95° to 100° C. water bath or oven, and held therein until the testing begins.

2. A cylinder is removed from the water bath or oven, and the contents thereof are adjusted in temperature 95°±1° C. in a 2-liter stainless steel bucket, and returned to the cylinder.

3. The cylinder contents are mixed by plunging two times with a perforated stainless steel disk or rubber stopper attached to the end of a stainless steel rod, which plunger is also used for the mixing in subsequent steps. 4. An aqueous solution of flocculant (containing 0.04 weight percent of flocculant polymer actives) is added by syringing the appropriate volumetric dose into the test sample and is then admixed therein by plunging "P1" times. The flocculant used for the tests of all the present examples was an ammonium acrylate polymer of within the molecular weight range of from about 1,000,000 to about 20,000,000, although the substitution of other anionic flocculants in these the tests would be expected to provide the same relative results.
5. An aqueous solution of clarification aid (containing 1.0 or 0.1 weight percent of clarification aid actives) is added (except in the control for each series) by syringing the appropriate volumetric dose into the test sample and is then admixed therein by plunging "P2" times. 6. A mud-clear liquor/mud interface forms in the cylinder. The time required for this interface to settle from the 900 ml mark down to the 700 ml of the graduated cylinder is recorded together with the time of day. 7. When the interface reaches the 700 ml mark, the cylinder is stoppered and returned to the water bath or oven, and held therein at 95° to 100° C. for a specific time period, "T1", described below. The level of the mud bed (the lower phase defined by the interface) is recorded (in ml) and the supernate is sampled by syringing 10 to 100 ml of liquor from a given depth in the cylinder.

8. The T1 time period is the time elapsed from the time recorded in step 6 above (at which time the interface reaches the 700 ml mark) to the supernate sampling of step 7 above. This T1 period may be between 15 and 60 minutes, provided it is the same for all cylinders in a test series. The depth from which the supernate is taken may be between 1 and 4 inches, provided such depth is the same for all cylinders in a test series.

9. The amount of suspended solids in the supernate sample taken from each cylinder is determined by standard drying techniques and is the primary measure of clarification aid performance.

The amount of flocculant added in Step 4 is noted in the specific examples in terms of mg of flocculant actives per liter of settler feed. The dosages of clarification aids are given in the examples below for the various tests in terms of mg of clarification aid actives per liter of settler feed. All other test conditions and any test procedure variations are set fouth in the specific examples.

EXAMPLE 1

Using the test procedure described above, a series of tests were conducted using settler feed from bauxite refinery A and the test conditions of: P1=4; P2=4; and T1=30 minutes. The flocculant was added to all test samples in an amount to produce 20 ft/hr settling of the mud interface. The clarification aids, pullulan, and for comparison dextran and starch, were added at a constant dosage, as an aqueous solution containing 0.1% actives by weight. The clarification aid and flocculant dosages and the test results, in terms of suspended solids in the supernate, are set forth below in Table 1.

TABLE 1

| Clarification Aid | Dosages (mg/L) | | Suspended Solids (mg/L) |
|---|---|---|---|
| | Clarification Aid | Flocculant | |
| (Control) | — | 3.2 | 280 |
| Dextran | 4.0 | 2.8 | 260 |
| Starch | 4.0 | 4.8 | 216 |
| Pullulan | 4.0 | 5.3 | 45 |
| Pullulan | 4.0 | 6.2 | 65 |
| Pullulan | 4.0 | 7.1 | 33 |

EXAMPLE 2

Using the test procedure described above, a series of tests were conducted using settler feed from bauxite refinery A and the test conditions of: P1=4; P2=4; and T1=90 minutes. The flocculant was added to all test samples in the amount of 3.4 mg/L actives dosage. The clarification aids, pullulan, and for comparison dextran, were added at 0.3 to 5.0 mg/liter dosages, as an aqueous solution containing 0.1% actives by weight. The clarification aid dosages and the test results, in terms of suspended solids in the supernate, are set forth below in Table 2.

TABLE 2

| Clarification Aid | Dose (mg/L) | Suspended Solids (mg/L) |
|---|---|---|
| (Control) | — | 244 |
| Dextran | 0.3 | 216 |
| Dextran | 2.0 | 176 |
| Dextran | 5.0 | 168 |
| Pullulan | 0.3 | 204 |
| Pullulan | 2.0 | 104 |
| Pullulan | 5.0 | 72 |
| Pullulan | 0.3 | 228 |
| Pullulan | 2.0 | 110 |
| Pullulan | 5.0 | 60 |

EXAMPLE 3

Using the test procedure described above, a series of tests were conducted using settler feed from bauxite refinery B and the test conditions of: P1=4; P2=20; and T1=30 minutes. The flocculant was added to all test samples in the amount of 3.6 mg/L actives dosage. The clarification aids, zooglan and lactan, and for comparison dextran, were added at a constant dosage, as an aqueous solution containing 0.1% actives by weight. The clarification aid dosage and the test results, in terms of suspended solids in the supernate, are set forth below in Table 3.

TABLE 3

| Clarification Aid | Dose (mg/L) | Suspended Solids (mg/L) |
|---|---|---|
| (Control) | — | 144 |
| Dextran | 13.0 | 148 |
| Lactan | 13.0 | 107 |
| Zooglan | 13.0 | 96 |

EXAMPLE 4

Using the test procedure described above, a series of tests were conducted using settler feed from bauxite refinery B and the test conditions of: P1=4; P2=2; and T1=30 minutes. The flocculant was added to all test samples in the amount of 3.6 mg/L actives dosage. The clarification aids, zooglan and rhamsan, and for comparison dextran, were added at a constant dosage, as an aqueous solution containing 0.1% actives by weight, while for comparison starch was added at 10 times the dosage of the other clarification aids (as a 1% solution). The clarification aid dosage and the test results, in terms of suspended solids in the supernate, are set forth below in Table 4.

TABLE 4

| Clarification Aid | Dose (mg/L) | Suspended Solids (mg/L) |
|---|---|---|
| (Control) | — | 144 |
| Dextran | 7.0 | 172 |
| Starch | 70.0 | 127 |
| Zooglan | 7.0 | 116 |
| Rhamsan | 7.0 | 120 |

EXAMPLE 5

Using the test procedure described above, a series of tests were conducted using settler feed from bauxite refinery C and the test conditions of: P1=10; P2=10; and T1=15 minutes. The flocculant was added to all test samples in an amount of 3.2 mg/L actives dosage.

The clarification aids, lactan, and for comparison dextran, were added at a constant dosage, as an aqueous solution containing 0.1% actives by weight, and then lactan was added at twice such dosage. The clarification aid dosage and the test results, in terms of suspended solids in the supernate, are set forth below in Table 5.

TABLE 5

| Clarification Aid | Dose (mg/L) | Suspended Solids (mg/L) |
| --- | --- | --- |
| (Control) | — | 268 |
| Dextran | 5.0 | 238 |
| Lactan | 5.0 | 196 |
| Lactan | 10.0 | 162 |

EXAMPLE 6

Using the test procedure described above, except Step 5 was done before Step 4, a series of tests were conducted using settler feed from bauxite refinery C and the test conditions of: P1=10; P2=10; and T1=15 minutes. The flocculant was added to all test samples in the amount of 4.0 mg/L actives dose. The clarification aids, lactan and rhamsan, and for comparison dextran, were added at a constant dosage, as an aqueous solution containing 0.1% actives by weight. The clarification aid dosage and the test results, in terms of suspended solids in the supernate, are set forth below in Table 6.

TABLE 6

| Clarification Aid | Dose (mg/L) | Suspended Solids (mg/L) |
| --- | --- | --- |
| (Control) | — | 434 |
| Dextran | 5.0 | 312 |
| Lactan | 5.0 | 300 |
| Rhamsan | 5.0 | 264 |

EXAMPLE 7

Using the test procedure described above, a series of tests were conducted using settler feed from bauxite refinery C and the test conditions of: P1=10; P2=10; and T1=15 minutes. The flocculant was added to all test samples in an amount of 4.0 mg/L actives dose. The clarification aids, lactan and rhamsan, and for comparison dextran, were added at a constant dosage, as an aqueous solution containing 0.1% actives by weight. The clarification aid dosage and the test results, in terms of suspended solids in the supernate, are set forth below in Table 7.

TABLE 7

| Clarification Aid | Dose (mg/L) | Suspended Solids (mg/L) |
| --- | --- | --- |
| (Control) | — | 434 |
| Dextran | 5.0 | 260 |
| Lactan | 5.0 | 234 |
| Rhamsan | 5.0 | 192 |

EXAMPLE 8

Using the test procedure described above, a series of tests were conducted using settler feed from bauxite refinery B and the test conditions of: P1=4; P2=4; and T1=60 minutes. The flocculant was added to all test samples in an amount of 3.2 mg/L actives dose. The clarification aids, pullulan, and for comparison dextran and starch, were added at a constant dosage, as an aqueous solution containing 1.0% actives by weight. In addition, a 1/10 blend of dextran/pullulan was tested at a dosage containing a 10 mg/L pullulan dosage. The clarification aid dosages and the test results, in terms of suspended solids in the supernate, are set forth below in Table 8.

TABLE 8

| Clarification Aid | Dose (mg/L) | Suspended Solids (mg/L) |
| --- | --- | --- |
| (Control) | — | 180 |
| Dextran | 10.0 | 142 |
| Pullulan | 10.0 | 101 |
| Dextran + Pullulan | 1.0 + 10.0 | 105 |

EXAMPLE 9

Using the test procedure described above, a series of tests were conducted using settler feed from bauxite refinery B and the test conditions of: P1=4; P2=4; and T1=45 minutes. The flocculant was added to all test samples in an amount of 3.2 mg/L actives dose. The clarification aids, lactan, pullulan and rhamsan, were added at a constant dosage, as an aqueous solution containing 1.0% actives by weight. The clarification aid dosage and the test results, in terms of suspended solids in the supernate, are set forth below in Table 9.

TABLE 9

| Clarification Aid | Dose (mg/L) | Suspended Solids |
| --- | --- | --- |
| (Control) | — | 199 |
| Pullulan | 10.0 | 81 |
| Lactan | 10.0 | 148 |
| Rhamsan | 10.0 | 150 |

EXAMPLE 10

Using the test procedure described above, a series of tests were conducted using settler feed from bauxite refinery B and the test conditions of: P1=4; P2=4; and T1=30 minutes. The flocculant was added to all test samples in an amount to produce 25 ft/hr settling of the mud interface. The clarification aid, pullulan, was added at two different dosages as an aqueous solution containing 1.0% actives by weight. The clarification aid and flocculant dosages and the test results, in terms of suspended solids in the supernate, are set forth below in Table 10.

TABLE 10

| Clarification Aid | Dosages (mg/L) | | Suspended Solids (mg/L) |
| --- | --- | --- | --- |
| | Clarification Aid | Flocculant | |
| (Control) | — | 2.9 | 230 |
| Pullulan | 3.0 | 4.2 | 137 |
| Pullulan | 10.0 | 5.7 | 127 |

EXAMPLE 11

Using the test procedure described above, a series of tests were conducted using settler feed from bauxite refinery B and the test conditions of: P1=4; P2=4; and T1=50 minutes. The flocculant was added to all test samples in an amount to produce 25 ft/hr settling of the mud interface. The clarification aids, lactan, was added at different dosages as an aqueous solution containing 1.0% actives by weight. The clarification aid and flocculant dosages and the test results, in terms of suspended solids in the supernate, are set forth below in Table 11.

TABLE 11

| Clarification Aid | Dosages (mg/L) | | Suspended Solids (mg/L) |
| --- | --- | --- | --- |
| | Clarification Aid | Flocculant | |
| (Control) | — | 4.8 | 146 |

TABLE 11-continued

| Clarification Aid | Dosages (mg/L) Clarification Aid | Flocculant | Suspended Solids (mg/L) |
| --- | --- | --- | --- |
| Lactan | 3.0. | 3.5 | 102 |
| Lactan | 10.0. | 2.0 | 85 |
| Lactan | 20.0. | 1.7 | 76 |

EXAMPLE 12

Using the test procedure described above, except that Step 4 was repeated after Step 5 (with a second dosage of flocculant and a third admixing, the plunges of which are designated "P3"), a series of tests were conducted using settler feed from bauxite refinery B and the test conditions of: P1=4; P2=20; P3=4; and T1=30 minutes. The flocculant was added to all test samples in an amount of 1.6 mg/L and 0.4 mg/L actives respectively for the 2 and 4 mg/L clarification aid dosages. The clarification aids, lactan, zooglan and rhamsan, were each added at such two dosage levels, as an aqueous solution containing 1.0% actives by weight. The clarification aid dosage and the test results, in terms of suspended solids in the supernate, are set forth below in Table 12.

TABLE 12

| Clarification Aid | Dose (mg/L) | Suspended Solids |
| --- | --- | --- |
| (Control) | — | 307 |
| Lactan | 2.0 | 210 |
| Zooglan | 2.0 | 206 |
| Rhamsan | 2.0 | 225 |
| Lactan | 4.0 | 146 |
| Zooglan | 4.0 | 135 |
| Rhamsan | 4.0 | 150 |

EXAMPLE 13

Using the test procedure described above, except that Step 5 was done before Step 4, a series of tests were conducted using settler feed from bauxite refinery B and the test conditions of: P1=4; P2=4; and T1=30 minutes. The flocculant was added to all test samples in an amount of 2.8 mg/L actives dosage. The clarification aids, lactan and zooglan, were added at the same dosage as an aqueous solution containing 0.1% actives by weight, and lactan was also added at twice such dosage. The clarification aid dosage and the test results, in terms of suspended solids in the supernate, are set forth below in Table 13.

TABLE 13

| Clarification Aid | Dose (mg/L) | Suspended Solids |
| --- | --- | --- |
| (Control) | — | 285 |
| Lactan | 5.0 | 262 |
| Zooglan | 5.0 | 258 |
| Lactan | 10.0 | 243 |

EXAMPLE 14

Using the test procedure described above, except with an addition dosage of flocculant following Step 5 (as described in Example 12 above), a series of tests were conducted using settler feed from bauxite refinery B and the test conditions of: P1=2; P2=30; P3=4; and T1=30 minutes. The flocculant was added to all test samples in an amount of 3.6 mg/L actives dose. The clarification aids, lactan and zooglan, and for comparison dextran, were added at a constant dosage as an aqueous solution containing 1.0% actives by weight. The clarification aid dosage and the test results, in terms of suspended solids in the supernate, are set forth below in Table 14.

table 14

| Clarification Aid | Dose (mg/L) | Suspended Solids |
| --- | --- | --- |
| (Control) | — | 270 |
| Dextran | 1.0 | 67 |
| Lactan | 1.0 | 41 |
| Zooglan | 1.0 | 39 |

EXAMPLE 15

Using the test procedure described above, except that Step 5 was done before Step 4, a series of tests were conducted using settler feed from bauxite refinery B and the test conditions of: P1=4; P2=20; and T1=30 minutes. The flocculant was added to all test samples in an amount of 3.6 mg/L actives dose. The clarification aids, lactan and zooglan, and for comparison dextran, were added at a constant dosage as an aqueous solution containing 1.0 actives by weight. The clarification aid dosage and the test results, in terms of suspended solids in the supernate, are set forth below in Table 15.

TABLE 15

| Clarification Aid | Dose (mg/L) | Suspended Solids |
| --- | --- | --- |
| (Control) | — | 404 |
| Dextran | 20.0 | 22 |
| Lactan | 20.0 | 14 |
| Zooglan | 20.0 | 19 |

The present invention provides a process for improved flocculation of Bayer process red mud-containing liquor using a conventional water soluble anionic flocculant to form a red mud phase and a supernatant from the red mud-containing liquor, the supernatant containing suspended solids, characterized by adding to the red mud-containing liquor a water soluble clarification aid in addition to the conventional flocculant, wherein the clarification aid is pullulan, lactan, zooglan, rhamsan, or combinations thereof. The present invention also provides a Bayer process wherein bauxite ore is digested in an aqueous alkaline medium whereby alumina present in the bauxite ore is solubilized in the aqueous medium, providing a red mud-containing liquor containing dissolved sodium aluminate and red mud solids and the red mud-containing liquor is flocculated to separate the red mud from the liquor, wherein the process is improved by adding to the red mud-containing liquor, to effectuate improved flocculation, a sufficient amount of an anionic flocculant and a sufficient amount of a polysaccharide clarification aid, wherein the clarification aid is pullulan, lactan, zooglan, rhamsan, or combinations thereof.

In preferred embodiment the clarification aid is added to the red mud-containing liquor in an amount sufficient to reduce the concentration of suspended solids in the supernatant. In preferred embodiment the clarification aid of at least 100,000 molecular weight. In preferred embodiment the clarification aid is within the molecular weight range of from about 500,000 to about 10,000,000.

In preferred embodiment the anionic flocculant is added to the red mud-containing liquor in an amount sufficient to form a red mud phase therein having a concentration of solids that is at least about 150 percent of the initial concentration of solids in the red mud-containing liquor upon standing. In preferred embodiment the clarification aid is added to the red mud-containing liquor in an amount sufficient to form a supernatant therein having a concentration of solids that is at least about 25 percent less than the concentration of solids in the supernatant formed without the clarification aid. In these and other preferred embodiments, the red-mud containing liquor is preferably a primary settler feed liquor, but the present invention does not exclude the use of the present process on one or more of the counter-current mud wash liquors.

The red mud-containing liquor may be any red mud-containing liquor, including not only primary settler feed, but also one or more of the wash liquors, which commonly are countercurrent wash liquors, and other liquors. The wash liquors typically: have a total alkalinity of from about 10 to about 200 grams per liter, expressed as sodium carbonate; have a solids content of from about 40 to about 350 grams per liter; and would typically have a temperature of from about 30° to about 80° C. at the time of flocculation.

In preferred embodiment the total alkalinity of the red mud-containing liquor is from about 10 to 300 grams per liter of red mud-containing liquor, expressed as sodium carbonate, and more preferably from about 100 to 300 grams per liter of red mud-containing liquor, expressed as sodium carbonate. In preferred embodiment the solids contents of the red mud-containing liquor is from about 25 grams per liter to about 350 grams per liter of the red mud-containing liquor, and more preferably from about 25 grams per liter to about 85 grams per liter of the red mud-containing liquor. In preferred embodiment the red mud-containing liquor flocculation is conducted at atmospheric pressures and at a temperature of from about 30° C. to about 115° C., and more preferably from about 80° C. to about 115° C.

In preferred embodiment the anionic flocculant is added to the red mud-containing liquor ahead of the polysaccharide clarification aid. In preferred embodiment the anionic flocculant is added to the red mud-containing liquor in an amount of from about 0.5 to about 20 mg of flocculant actives per liter of red mud-containing liquor. In preferred embodiment the anionic flocculant is added to the red mud-containing liquor in an amount of from about 0.001 to about 0.1 weight percent of flocculant actives based on the weight of red mud solids in the red mud-containing liquor.

In preferred embodiment the clarification aid is added to the red mud-containing liquor in an amount of from about 0.05 to about 50 mg of clarification aid actives per liter of red mud-containing liquor. In preferred embodiment the clarification aid is added to the red mud-containing liquor in an amount of from about 0.0005 to about 0.1 weight percent of clarification aid actives based on the weight of the red mud solids in the red mud-containing liquor. In preferred embodiment the clarification aid is added to the red mud-containing liquor in an amount of from about 5 to about 500 weight percent of clarification aid actives based on the weight of the flocculant actives added to the red mud-containing liquor.

In preferred embodiment one or both of the anionic flocculant and clarification aid are added to the red mud-containing liquor as alkaline aqueous solutions having a pH of at least about 9. In preferred embodiment the anionic flocculant is derived from ethylenically-unsaturated monomers, is comprised of from about 0 to about 30 mole percent of nonionic mer units and from about 70 to about 100 mole percent of anionic mer units and has a weight average molecular weight of at least about 500,000. In preferred embodiment the total alkalinity of the red mud-containing liquor is from about 10 to 300 grams per liter of red mud-containing liquor, and more preferably from about 100 to 300 grams per liter, expressed as sodium carbonate, the solids contents of the red mud-containing liquor is from about 25 grams per liter to about 350 grams per liter of the red mud-containing liquor, and more preferably from about 25 to about 85 grams per liter, and the flucculation of the red mud-containing liquor is conducted at atmospheric pressure and at a temperature of from about 30° C. to about 115° C., and more preferably from about 80° C. to about 115° C.

INDUSTRIAL APPLICABILITY OF THE INVENTION

The present invention is applicable to the Bayer process for the production of alumina from bauxite ore.

We claim:

1. A process for flocculation of Bayer process red mud-containing liquor using a water soluble anionic flocculant to form a red mud phase and a supernatant from said red mud-containing liquor, said supernatant containing suspended solids, said process comprising adding to said red mud-containing liquor a water soluble clarification aid in addition to said flocculant, wherein said clarification aid is selected from the group consisting of pullulan, lactan, zooglan, rhamsan, and combinations thereof and said clarification aid is added to said red mud-containing liquor in an amount sufficient to reduce the concentration of suspended solids in said supernatant.

2. The process of claim 1 wherein said clarification aid is of at least about 50,000 molecular weight.

3. The process of claim 1 wherein said clarification aid is within the molecular weight range of from about 500,000 to about 10,000,000.

4. The process of claim 1 wherein said anionic flocculant is added to said red mud-containing liquor in an amount sufficient to flocculate said red mud.

5. The process of claim 1 wherein said anionic flocculant is added to said red mud-containing liquor in an amount sufficient to form a red mud phase therein having a concentration of solids that is at least about 150 percent of the initial concentration of solids in said red mud-containing liquor.

6. The process of claim 1 wherein said clarification aid is added to said red mud-containing liquor in an amount sufficient to form a supernatant therein having a concentration of solids that is at least about 25 percent less than the concentration of solids in said supernatant formed without said clarification aid.

7. The process of claim 1 wherein said clarification aid is pullulan.

8. The process of claim 1 wherein the total alkalinity of said red mud-containing liquor is from about 10 to 300 grams per liter, expressed as sodium carbonate.

9. The process of claim 1 wherein the solids contents of said red mud-containing liquor is from about 25 grams per liter to about 350 grams per liter.

10. The process of claim 1 wherein said flocculation of said red mud-containing liquor is conducted at atmospheric pressures and at a temperature of from about 30° C. to about 115° C.

11. The process of claim 1 said red mud-containing liquor is a primary settler feed.

12. A Bayer process wherein bauxite ore is digested in an aqueous alkaline medium whereby alumina present in said bauxite ore is solubilized in said aqueous medium providing a red mud-containing liquor containing dissolved sodium aluminate and red mud solids and said red mud-containing liquor is flocculated to separate said mud solids from the liquor, wherein said process comprises:

adding to said red mud-containing liquor to effectuate flocculation a sufficient amount of an anionic flocculant and a sufficient amount of a polysaccharide clarification aid, wherein said clarification aid is selected from the group consisting of pullulan, lactan, zooglan, rhamsan, and combinations thereof.

13. The process of claim 12 wherein said anionic flocculant is added to said red mud-containing liquor in an amount of from about 0.5 to about 20 mg of flocculant per liter.

14. The process of claim 12 wherein said anionic flocculant is added to said red mud-containing liquor in an amount of from about 0.001 to about 0.1 weight percent of flocculant based on the weight of red mud solids in said red mud-containing liquor.

15. The process of claim 12 wherein said clarification aid is added to said red mud-containing liquor in an amount of from about 0.05 to about 50 mg of clarification aid per liter.

16. The process of claim 12 wherein said clarification aid is added to said red mud-containing liquor in an amount of from about 0.0005 to about 0.1 weight percent of clarification aid based on the weight of said red mud solids in said red mud-containing liquor.

17. The process of claim 12 wherein said clarification aid is added to said red mud-containing liquor in an amount of from about 5 to about 500 weight percent of clarification aid based on the weight of said flocculant actives added to said red mud-containing liquor.

18. The process of claim 12 wherein said one or both of said anionic flocculant and clarification aid are added to said red mud-containing liquor as alkaline aqueous solutions having a pH of at least about 9.

19. The process of claim 12 wherein said anionic flocculant is derived from ethylenically-unsaturated monomers, is comprised of from about 0 to about 30 mole percent of nonionic mer units and from about 70 to about 100 mole percent of anionic mer units and has a weight average molecular weight of at least about 500,000.

20. The process of claim 12 wherein the total alkalinity of said red mud-containing liquor is from about 10 to 300 grams per liter, expressed as sodium carbonate;

the solids contents of said red mud-containing liquor is from about 25 grams per liter to about 350 grams per liter; and said flocculation of said red mud-containing liquor is conducted at atmospheric pressure and at a temperature of from about 30° C. to about 115° C.

21. The process of claim 12 wherein said red mud-containing liquor is a primary settler feed.

* * * * *

UNITED STATES PATENT AND TRADEMARK OFFICE
CERTIFICATE OF CORRECTION

PATENT NO. : 5,217,620
DATED : June 8, 1993
INVENTOR(S) : R. P. Mahoney, L. J. Connelly and R. L. Wetegrove It is certified that error appears in the above-identified patent and that said Letters Patent is hereby corrected as shown below:

In Column 2, line 27, before "trihydrate" insert -- alumina --.

In Column 10, line 51, after "ture" insert -- to --.

In Column 14, line 24, which is the heading of Table 9, after "Solids" insert -- (mg/L) --.

In Column 15, line 27, which is the heading of Table 12, after "Solids" insert -- (mg/L) --.

In Column 15, line 51, which is the heading of Table 13, after "Solids" insert -- (mg/L) --.

In Column 16, line 5, which is the heading of Table 14, after "Solids" insert -- (mg/L) --.

UNITED STATES PATENT AND TRADEMARK OFFICE
CERTIFICATE OF CORRECTION

PATENT NO. : 5,217,620
DATED : June 8, 1993
INVENTOR(S) : R. P. Mahoney, L. J. Connelly and R. L. Wetegrove It is certified that error appears in the above-indentified patent and that said Letters Patent is hereby corrected as shown below:

In Column 16, line 26, which is the heading of Table 15, after "Solids" insert --(mg/L)--.

Signed and Sealed this

Eleventh Day of January, 1994

Attest:

BRUCE LEHMAN

Attesting Officer     Commissioner of Patents and Trademarks